United States Patent [19]

Okada

[11] Patent Number: 5,352,727

[45] Date of Patent: Oct. 4, 1994

[54] SYNDIOTACTIC POLYSTYRENE COMPOSITION

[75] Inventor: Akihiko Okada, Ichihara, Japan

[73] Assignee: Idemitsu Kosan Co., Ltd., Tokyo, Japan

[21] Appl. No.: 118,334

[22] Filed: Sep. 9, 1993

[30] Foreign Application Priority Data

Sep. 10, 1992 [JP] Japan .................................. 4-241582

[51] Int. Cl.$^5$ .............................................. C08K 7/14
[52] U.S. Cl. ...................................... 524/495; 525/70; 525/71; 525/74; 525/86; 525/87; 525/207; 525/208
[58] Field of Search ................ 524/495; 525/285, 286, 525/71, 70, 74, 86, 87, 208, 207, 347, 347.2; 526/336

[56] References Cited

U.S. PATENT DOCUMENTS

| | | | |
|---|---|---|---|
| 4,680,353 | 7/1987 | Ishihara et al. | 526/347.2 |
| 4,780,509 | 10/1988 | Taubitz et al. | 525/285 |
| 4,886,856 | 12/1989 | Chen et al. | 525/286 |
| 5,118,761 | 6/1992 | Dharmarajan et al. | 525/201 |
| 5,145,950 | 9/1992 | Funaki et al. | 426/415 |
| 5,164,479 | 11/1992 | Funaki et al. | 526/347.2 |
| 5,183,871 | 2/1993 | Yamasaki et al. | 526/347.2 |
| 5,250,629 | 10/1993 | Tani et al. | 526/336 |

FOREIGN PATENT DOCUMENTS 0318793 6/1989 European Pat. Off. .
0508303 10/1992 European Pat. Off. .

*Primary Examiner*—Veronica P. Hoke
*Attorney, Agent, or Firm*—Oblon, Spivak, McClelland, Maier & Neustadt

[57] ABSTRACT

There are disclosed a polystyrene composition which comprises 100 parts by weight of a resin component comprising 0 to 99% by weight of syndiotactic polystyrene (SPS) (a) and 100 to 1% by weight of a modified syndiotactic polystrene (SPS) (b) and 1 to 100 parts by weight of a rubbery elastomer which can react with the functional group of the component (b) as the component (c) and optionally, 1 to 350 parts by weight of an inorganic filler (e); and a polystyrene composition which comprises 100 parts by weight of a resin component comprising 0 to 99% by weight of the component (a) and 100 to 1% by weight of the component (b), 1 to 10 parts by weight of the component (c) and 1 to 100 parts by weight of a rubbery elastomer (d) and optionally, 1 to 350 parts by weight of an organic filler (e). The above compositions are greatly improved in impact resistance, elongation and retention of physical properties during recycling without detriment to heat resistance and modulus of elasticity.

16 Claims, No Drawings

SYNDIOTACTIC POLYSTYRENE COMPOSITION

BACKGROUND OF THE INVENTION

1. Field of the Invention

The present invention relates to a novel polystyrene composition. More particularly, it pertains to a syndiotactic polystyrene composition which is greatly improved in impact resistance, elongation and retention of physical properties during recycling without detriment to heat resistance and modulus of elasticity.

2. Description of Related Arts

A styrenic polymer having syndiotactic configuration (SPS) is excellent in heat resistance and chemical resistance but is poor in impact resistance and therefore, it has heretofore suffered the disadvantage that it is inevitably limited in the scope of application as a construction material. In order to solve the above-mentioned problem, attempts have been made to improve the impact resistance of SPS, for example, by blending a rubbery elastomer and/or other thermoplastic resin with SPS. (Refer to Japanese Patent Application Laid-Open Nos. 257950/1987, 146944/1989, 182344/1989, 279944/1989 and 64140/1990.)

In particular, Japanese Patent Application Laid-Open No. 146944/1989 proposes the use of a styrenic compound as a component and as a rubbery elastomer and Japanese Patent Application Laid-Open No. 279944/1989 proposes the addition of block or graft copolymer containing atactic polystyrene chain as a compatibilizer to a SPS/rubber composition.

However, since there is used in the above-proposed composition, a rubbery component itself or a block or graft copolymer containing atactic polystyrene chain as a compatibiltzer for the purpose of improving the compatibility between inherently incompatible SPS and the rubbery component and enhancing the dispersibility and interfacial strength of the rubbery component, the problem still remains unsolved in that the working effect as the compatibilizer is insufficient resulting in slight enhancement of impact resistance. On the other hand, the addition of a large amount of the rubbery component or the compatibilizer containing atactic polystyrene chain for the purpose of sufficiently enhancing the impact resistance brings about a problem that the heat resistance and modulus of elasticity of the resultant composition are inevitably lowered to a great extent.

SUMMARY OF THE INVENTION

The object of the present invention under such circumstances is to provide a polystyrene composition which is remarkably improved in its impact resistance and elongation without detriment to its heat resistance and modulus of elasticity and also well suited to be molded into industrial materials such as electric and electronic materials, industrial construction materials, car parts, domestic electrical appliances and various mechanical parts.

In view of the above, intensive research and investigation were continued by the present inventors in order to develop a polystyrene composition provided with the aforesaid favorable properties. As a result, it has been found by the present inventors that a syndiotactic polystyrene composition which is greatly improved in impact resistance, elongation and retention of physical properties during recycling without detriment to heat resistance and modulus of elasticity is obtained by preparing in advance a high molecular compound comprising a syndiotactic polystyrene (SPS) and a rubbery elastomer and then further blending it with SPS as the base material or by forming a high molecular compound comprising SPS and a rubbery elastomer while being blended with SPS as the base material; that the above-mentioned high molecular compound is usable as a compatibilizer between SPS and the rubbery elastomer, and also a syndiotactic polystyrene composition which is greatly improved in impact resistance, elongation and retention of physical properties during recycling without detriment to heat resistance and modulus of elasticity is obtained even by a small addition of such compatibilizer when the aforesaid composition is compared with the compound obtained by simply blending SPS with the rubbery elastomer; and that by compounding an inorganic filler with the foregoing impact-resistant syndiotactic polystyrene composition, there is obtained a resin composition which is increased in modulus of elasticity and heat distortion temperature and, as compared with as resin composition not compounded with the above-mentioned high molecular compound, is remarkably improved in impact strength and elongation. The present invention has been accomplished on the basis of the aforesaid finding and information.

Specifically, the first aspect of the present invention provides a polystyrene composition which comprises 100 parts by weight of a resin component comprising 0 to 99% by weight of a styrenic polymer having syndiotactic configuration (a) and 100 to 1% by weight of a styrenic polymer having syndiotactic configuration and a functional group (b); and 1 to 100 parts by weight of a rubbery elastomer which can react with said functional group of the component (b) as the component (c), said components (a)+(b) and (c) being blended with each other. The second aspect thereof provides a polystyrene composition which comprises 100 parts by weight of a resin component comprising 0 to 99% by weight of the component (a) and 100 to 1% by weight of the component (b); 1 to 10 parts by weight of the component (c); and 1 to 100 parts by weight of a rubbery elastomer (d), said components (a)+(b), (c) and (d) being blended with each other. The third aspect thereof provides a polystyrene composition which comprises 100 parts by weight of a resin component comprising to 99% by weight of the component (a) and 100 to 1% by weight of the component (b); 1 to 100 parts by weight of the component (c); and 1 to 350 parts by weight of an inorganic filler (e), said components (a)+(b), (c) and (e) being blended with each other. The fourth aspect thereof provides a polystyrene composition which comprises 100 parts by weight of a resin component comprising 0 to 99% by weight of the component (a) and 100 to 1% by weight of the component (b); 1 to 10 parts by weight of the component (c); 1 to 100 parts by weight of the component (d); and 1 to 350 parts by weight of the component (e), said components (a)+(b), (c), (d) and (e) being blended with each other.

In the composition according to the present invention, there is used the resin component comprising 0 to 99% by weight of a styrenic polymer having syndiotactic configuration (a) and 100 to 1% by weight of a styrenic polymer having syndiotactic configuration and a functional group (b).

DESCRIPTION OF PREFERRED EMBODIMENT

Here, the styrenic polymer having syndiotactic configuration (a) means that its stereochemical structure is of syndiotactic configuration, i.e. the stereostructure in which phenyl groups of substituted phenyl groups as side chains are located alternately at opposite directions relative to the main chain consisting of carbon-carbon bonds. Tacticity is quantitatively determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. The styrenic polymers having such syndiotactic configuration as mentioned in the present invention usually means polystyrene, poly(alkylstyrene), poly(halogenated styrene), poly(halogenated alkylstyrene), poly(alkoxystyrene), poly(vinyl benzoate), hydrogenated polymer thereof, the mixture thereof, and copolymers containing the above polymers as main components, having such a syndiotacticity as determined by the above-mentioned method that the proportion of racemic diad is at least 75%, preferably at least 85%, or the proportion of racemic pentad is at least 30%, preferably at least 50%. The poly(alkylstyrene) includes poly(methylstyrene), poly(ethylstyrene), poly(isopropylstyrene), poly(tert-butylstyrene), poly(phenylstyrene), poly(vinylnaphthalene) and poly(vinylstyrene). Poly(halogenated styrene) includes poly(chlorostyrene), poly(bromostyrene), and poly(fluorostyrene). Poly(halogenated alkylstyrene) includes poly(chloromethylstyrene). Poly(alkoxystyrene) includes poly(methoxystyrene), and poly(ethoxystyrene).

The particularly desirable styrenic polymers are polystyrene, poly(p-methylstyrene), poly(m-metylstyrene), poly(p-tert-butylstyrene), poly(p-chlorostyrene), poly(m-chlorostyrene), poly(p-fluorostyrene), hydrogenated polystyrene and the copolymer containing the structural units thereof.

The molecular weight of the styrenic polymer to be used in the present invention is not specifically limited, but is desirably 10,000 or more, more desirably 50,000 or more in terms of weight-average molecular weight. The molecular-weight distribution, that is, the broadening of molecular weight of the styrenic polymer is not specifically limited as well, but may be in a wide range. A weight-average molecular weight of less than 10,000 is unfavorable since the composition or molding obtained is deteriorated thereby in the thermal and mechanical properties.

The styrenic polymer having such syndiotactic configuration can be produced by polymerizing a styrenic monomer which corresponds to the above styrenic polymer in the presence or absence of a solvent such as an inert hydrocarbon by the use of a catalyst comprising a titanium compound and a condensation product of water and trialkylaluminum (Japanese Patent Application Laid-Open No. 187708/1987). In addition, the poly(halogenated alkylstyrene) and the hydrogenated product thereof can be produced by the processes described in Japanese Patent Application Laid-Open Nos. 46912/1989 and 178505/1989, respectively.

On the other hand, the styrenic polymer having syndiotactic configuration and a functional group as the component (b) is a modified product from the above-mentioned styrenic polymer having syndiotactic configuration, and is produced by, for example, (1) introduction of a functional group through copolymerization at the time of polymerization, (2) introduction of a functional group at the time of cessation of polymerization, (3) grafing by taking advantage of the aforementioned item (1) of (2) or the like, any of which however, does not limit the production method thereto. In addition, the modification rate is not specifically limited.

Examples of the modified product through the item 1) include copolymer of styrene and p-methylstyrene or divinylbenzene, those through the item 2) include glycidyl methacrylate-end-modified SPS and maleic anhydride-end-modified SPS and those through the items 3) include styrene/divinylbenzene copolymer onto which glycidyl methacrylate is grafted and styrene/p-methylstyrene copolymer onto which maleic anhydride is grafted in the presence of a radical generating agent.

In the composition according to the present invention there is used as the component (c), a rubbery elastomer which can react with the functional group of the styrenic polymer having syndiotactic configuration and a functional group as the component (b). Examples of such rubbery elastomer include natural rubber, polybutadiene, polyisoprene, polyisobutyrene, neoprene, polysulfide rubber, thiokol rubber, acrylic rubber, urethane rubber, silicon rubber, epichlorohydrin rubber, styrene/butadiene block copolymer (SBR), styrene/butadiene/styrene block copolymer (SBS), hydrogenated styrene/butadiene/styrene block copolymer (SEBS), styrene/isoprene block/styrene block copolymer (SIS) hydrogenated styrene/isoprene block/styrene block copolymer (SEPS), ethylene/propyrene rubber (EPR), ethylene/propylene/diene rubber (EPDM) and modified rubbers therefrom.

Among the above-mentioned elastomers, SEBS, SBR, SBS, SEPS, and SIS are preferably used in particular. Examples of the particularly desirable modified rubbers include maleic anhydride-modified SEBS, maleic anhydride-modified EPR, epoxy group-modified SEBS and rubber-modified EPR. In the second second and fourth aspects of the present invention, there is preferably used a rubbery elastomer in the component (c) which is the same as or compatible with the rubbery elastomer in the component (d). It is necessary in the first and third aspects of the present invention that 1 to 100 parts by weight of the rubbery elastomer as the component (c) be blended with 100 parts by weight of the SPS-based resin component comprising the components (a) and (b). An amount of the component (c) less than 1 part by weight results in failure to sufficiently exert the effect on improving impact resistance, whereas that more than 100 parts by weight will cause undesirable decrease in the modulus of elasticity and heat resistance of the composition due to the influence of the rubbery elastomer.

It is necessary in the second and forth aspects of the present invention that 0.1 to 10 parts by weight of the rubbery elastomer as the component (c) be blended with 100 parts by weight of the SPS-based resin component comprising the component (a) and (b). An amount of the component (c) less than 0.1 part by weight results in failure to sufficiently exhibit the effect as the compatibilizer, whereas that more than 10 parts by weight will cause unfavorable decrease in the modulus of elasticity and heat resistance of the composition and also disadvantage in the production cost of the composition.

It is important in the composition according to the present invention that the above-mentioned styrenic polymer having syndiotactic configuration and a functional group (modified SPS) as the component (b) and the rubbery elastomer as the component (c) constitute a high molecular compound, which can be prepared by the reaction (1) among modified SPS/rubbery elastomer/crosslinking agent, (2) among modified SPS/modified rubber/crosslinking agent, (3) between modified SPS/modified rubber or the like.

The above-mentioned high molecular compound is obtained by reacting with a crosslinking agent in the presence or absence of a solvent and an other type of resin or by reacting the functional groups of a modified polymer directly or by the use of a crosslinking agent. The reaction is effected by means of a known method, preferably by the use of an extruder in molten state.

It is advantageous to prepare the high molecular compound in advance from the standpoint of the ease of the reaction between the components (b) and (c). On the other hand, objective polystyrene composition according to the present invention can be obtained by simultaneously melt-kneadings the components (a) to (d) without being restricted to the aforementioned method.

It is desirable that the components (b) and (c) be reacted in advance with each other, and the reaction procedure between them is exemplified by the following. (1) Reaction among a modified SPS/a rubbery elastomer/a crosslinking agent.

The high molecular compound comprising the components (b) and (c) can be produced by adding usually 0.1 to 5 parts by weight of a known crosslinking agent to 100 parts by weight of the mixture of 5 to 95% by weight of a modified SPS as the component (b) and 95 to 5% by weight of a rubbery elastomer as the component (c), while about 0.01 to 1 part by weight of a radical generating agent may be added to the reaction system to accelerate the reaction. A syndiotactic polystyrene may be used as the component (b) without limitation and is preferably exemplified by styrene/p-methylstyrene copolymer and styrene/divinylbenzene copolymer.

The usable crosslinking agent is exemplified by but not limited to sulfur, sulfur compounds such as tetrathiuram disulfide and multifunctional vinyl monomers such as divinylbenzene and trimethylolpropane trimethacrylate. (2) Reaction among a modified SPS/a modified rubber/a crosslinking agent.

The high molecular compound comprising the component (b) and (c) can be produced by adding usually 0.1 to 100 parts by weight of a multifunctional compound reactive with each of the functional groups to 100 parts by weight of the mixture of 5 to 95% by weight of a modified SPS as the component (b) and 95 to 5% by weight of a rubbery elastomer as the component (c). The preferably usable component (b) include SPS modified with glycidyl methacrylate or maleic anhydride at an end, sulfonated SPS, maleic anhydride-modified SPS and glycidyl methacrylate-grafted SPS. The usable multifunctional compound is exemplified by but not limited to, provided that it is reactive with the functional groups of both the modified SPS and the modified rubber, polyfunctional amines such as hexamethylenediamine and polyethylene imine, polyfunctional amides such as ethylenebisamide, nylon oligomer and polyamide dicarboxylic acid such as succinic acid and adipic acid, diol such as 1,4-butanediol, ethylene glycol and bisphenol A, glycidyl alcohol, amine acid, glycidyl ether of bisphenol A, etc. (3) Reaction between a modified SPS/a modified rubber.

The high molecular compound comprising the component (b) and (c) can be produced by reacting 5 to 95% by weight of a modified SPS as the component (b) with 95 to 5% by weight of a modified rubbery elastomer as the component (c).

The combination of functional groups of a modified SPS and a modified rubber is not limited provided that they are reactive with each other, and exemplified by the combination of an acid anhydride and an epoxy group or an amino group as a desirable one. A catalyst may be added to the reaction system to accelerate the reaction between the functional groups.

The above-mentioned combination is specifically exemplified by but not limited to the combination of maleic anhydride-modified SPS and an epoxy group-modified SEBS, an epoxy group-modified EPR, an amino group modified SEBS or an amino group-modified EPR and that of an epoxy group-modified SPS and a maleic anhydride-modified SEBS or a maleic anhydride-modified EPR.

In the second and fourth aspects of the present invention, the high molecular compound comprising the components (b) and (c), is employed for the purpose of the compatibilizer, and a rubbery elastomer is blended as the component (d) to improve impact resistance.

Examples of the rubbery elastomer include natural rubber, polybutadiene, polyisoprene, polyisobutyrene, neoprene, polysulfide rubber, thiokol rubber, acrylic rubber, urethane rubber, silicone, rubber, epichlorohydrin rubber, styrene/butadiene block copolymer (SBR), a styrene/butadiene/styrene block copolymer (SBS), hydrogenated styrene/butadiene/styrene block copolymer (SEBS), styrene/isoprene block/styrene block copolymer (SIS) hydrogenated styrene/isoprene block/styrene block copolymer (SEPS), ethylene/propylene rubber (EPR), ethylene/propylene/diene rubber (EPDM) and modified rubbers therefrom.

Among the above-mentioned elastomers, SEBS, SBR, SBS, SEPS and SIS are preferably used in particular.

In the second and fourth aspects of the present invention, the rubbery elastomer as the component (d) is used in an amount of 1 to 100 parts by weight based on 100 parts by weight of the SPS-based resin component comprising the components (a) and (b). An amount thereof less than 1 part by weight brings about insufficient effect on improving impact resistance, while that more than 100 parts by weight causes undesirable decrease in heat resistance and rigidity due to the rubbery elastomer.

In the third and fourth aspects of the present invention, an inorganic filler is blended as the component (e). The inorganic filler may be in any of the forms including fiber, granule and powder.

Examples of fibrous fiber include glass fiber, carbon fiber and whisker in the form of cloth, mat, bound and cut fiber, short fiber filament, whisker, etc. There is preferably used the bound and cut fiber having a length of 0.05 to 50 mm and a diameter of 5 to 20 μm.

Examples of granular or powdery filler include talc, carbon black, graphite, titanium oxide, silica, mica, calcium carbonate, calcium sulfate, barium carbonate, magnesium carbonate, magnesium sulfate, barium sulfate, oxysulfate, tin oxide, alumina, kaolin, silicon carbide, metallic powder, glass powder, glass flake and glass bead.

Among the above-mentioned various inorganic fillers are particularly desirable glassy fillers including glass powder, glass flake, glass bead, glass filament, glass fiber, glass roving and glass mat.

The above-mentioned filler is preferably surface-treated. The coupling agent to be used for the surface treatment is to improve adhesion between the filler and resin, and may be optionally selected for use from the publicly known silane-based coupling agent and titanium-based coupling agent. Examples of the preferably usable coupling agents among them include aminosilane such as γ-aminopropyltrimethoxysilane, N-β-(aminoethyl)-, γ-aminopropyltrimethoxysilane, γ-glycidoxypropyltrimethoxysilane and β-(3,4-epoxy-cyclohexyl)ethyltrimethoxysilane, epoxysilane, isopropyltriaminoethyltitanate, etc.

In the third and fourth aspects of the present invention, the inorganic filler as the component (e) is blended in an amount of 1 to 350, preferably 5 to 200 parts by weight based on 100 parts by weight of the SPS-based resin component comprising the component (a) and (b). An amount thereof less than 1 part by weight leads to failure to sufficiently exert the blending effect as a filler, whereas that more than 350 parts by weight gives rise to the disadvantage that the dispersibility thereof is worsened, thereby making it difficult to mold the composition.

The resin composition according to the present invention may be blended with, as desired, an additive such as antioxidant and nucleating agent or an other thermoplastic resin to the extent that the object of the present invention is not impaired. Further in the third and fourth aspects of the present invention about 0.1 to 5 parts by weight of maleic anhydride-modified polyphenylene ether or the like per 100 parts by weight of the SPS-based resin composition comprising the component (a) and (b) may be blended in order to improve the adhesiveness between the inorganic filler as the component (e) and the resin.

The polystyrene composition thus prepared is characterized by the following.

In the first aspect of the present invention, the composition is markedly improved in impact strength and elongation by the use of the high molecular compound formed through the reaction between the components (b) and (c), as compared with the binary system of SPS/rubbery elastomer. The compound also decreases the change in physical properties arising from kneading and molding conditions and deterioration of physical properties during recycling.

In the second aspect thereof, the composition is remarkably improved in impact resistance and elongation without detriment to heat resistance and modulus of elasticity by virtue of the use of the high molecular compound formed through the reaction between the components (b) and (c) as the compatibilizer between the components (a) and (d), as compared with the simple blend of the components (a) and (d). In addition, the compatibilizer contributes to the economical efficiency due to the small usage of the component (c) and decreases the change in physical properties arising from kneading and molding conditions as well as deterioration of physical properties during recycling.

In the third aspect thereof, the composition is markedly improved in impact strength and elongation without detriment to modulus of elasticity and heat distortion temperature by the addition of the high molecular compound formed through the reaction between the components (b) and (c), as compared with the simple blend of the components (a) and (e).

In the fourth aspect thereof, the composition is improved in impact strength and elongation without detriment to modulus of elasticity and heat distortion temperature by the use of the high molecular compound formed through the reaction between the components (b) and (c) as the compatibilizer, as compared with the ternary system of the components (a), (d) and (e). Moreover, the compound as the compatibilizer contributes to the economical efficiency due to the small usage of the component (c).

In summary, the polystyrene composition according to the present invention is a syndiotactic polystyrene composition remarkably improved in impact resistance and elongation without detriment to heat resistance and modulus of elasticity, and is favorably used for molding industrial materials including electric and electronic materials such as connectors and print circuit board; industrial construction materials; automobile parts such as connectors to be mounted on vehicles, wheel cap and cylinder head cover; domestic electrical appliances, various machine parts, etc.

In the following, the present invention will be described in more detail with reference to non-limitative examples and comparative examples.

REFERENCE EXAMPLE 1

In a 2 L(L=liter) reaction vessel were placed 1 L of purified styrene, 0.1 L of p-methylstyrene, methylaluminoxane in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 320 g of polymer. As the result of analysis by gel permeation chromatography using 1,2,4-trichlorobenzene at 130° C. as the solvent, the polymer thus produced had a weight-average molecular weight of 390,000 and a ratio of weight-average molecular weight to number-average molecular weight of 2.60.

It was confirmed that the polymer was polystyrene having syndiotactic configuration (SPS) containing p-methylstyrene unit of 12 mol % from the results of melting point measurement and $^{13}$C-NMR analysis using carbon isotope.

REFERENCE EXAMPLE 2

In a 2 L reaction vessel were placed 1.0 L of purified styrene, 0.01 L of divinylbenzene, methylaluminoxane in an amount of 5 mmol as aluminum atom, 5 mmol of triisobutylaluminum and 0.025 mmol of pentamethylcyclopentadienyltitanium trimethoxide, which were then subjected to polymerization reaction at 90° C. for 5 hours. After the completion of the reaction, the catalytic components were decomposed with a solution of sodium hydroxide in methanol and then the reaction product was washed with methanol repeatedly and dried to afford 320g of polymer. As the result of analysis by gel permeation chromatography using 1,2,4-trichlorobenzene at 130° C. as the solvent, the polymer thus produced had a weight-average molecular weight of 385,000 and a ratio of weight-average molecular weight to number-average molecular weight of 2.55.

It was confirmed that the polymer was polystyrene having syndiotactic configuration (SPS) containing divinylbenzene unit of 1 mol % from the results of melting point measurement and $^{13}$C-NMR analysis using carbon isotope.

REFERENCE EXAMPLE 3

In a 5 L reaction vessel were placed 1.2 L of purified styrene, 2.4 L of toluene, methylaluminoxane in an amount of 30 mmol as aluminum atom, 30 mmol of triisobutylaluminum and 0.15 mmol of Pentamethylcyclopentadienyltitanium trimethoxide, which were then subjected to polymerization reaction at 80° C. for 1 hour, followed by further polymerization reaction at 80° C. for 1 hour with the addition of 50 ml of glycidyl methacrylate. After the completion of the reaction, the catalytic components were decomposed with a solution of sodium hydroxide in methanol and then the reaction product was washed with methanol repeatedly and dried to afford 360 g of polymer. As the result of analysis by gel permeation chromatography using 1,2,4-trichlorobenzene at 130° C. as the solvent, the polymer thus produced had a weight-average molecular weight of 253,000 and a ratio of weight-average molecular weight to number-average molecular weight of 2.60.

It was confirmed that the polymer was polystyrene having syndiotactic configuration (SPS) the end of which was modified with glycidyl methacrylate from the results of melting point measurement and $^{13}$C-NMR analysis using carbon isotope.

REFERENCE EXAMPLE 4

In a 2 L reaction vessel were placed 100 g of SPS as obtained in Reference Example 2, 500 ml of toluene, 10 ml of glycidyl methacrylate and 1 g of azobis(isobutyronitrile) which were then subjected to modification reaction at 80° C. for 5 hours. After the completion of the reaction, the reaction product was washed with methanol repeatedly and dried to afford 110 g of polymer, which was subjected to Soxhlet extraction using methyl ethyl ketone, and IR analysis. As a result, the introduction of glycidyl methacrylate was confirmed.

REFERENCE EXAMPLE 5

100 parts by weight of SPS in Reference Example 1, 3 parts by weight of maleic anhydride and 1 part by weight of 2,3-dimethyl-2,3-diphenylbutane (produced by Nippon Oil & Fat Co., Ltd. under the tradename "NOPHMER BC") were dry-blended and melt kneaded by the use of a 30 mm twin-screw extruder at a revolution of 200 rpm at a temperature set to 300° C., while the resin temperature was about 330° C. The resultant strand was cooled and then pelletized to produce maleic anhydride-modified SPS.

In order to measure the modification rate, 1 g of the resultant modified SPS was dissolved chloroform and thereafter reprecipitated in methanol, and the recovered polymer was subjected to Soxhlet extraction using methanol and dried. The modification rate was determined from the intensity of carbonyl absorption in infrared (IR) absorption spectrum.

PREPARATION EXAMPLE 1

50 parts by weight of SPS in Reference Example 1, 50 parts by weight of SEBS (produced by Shell Chem. Co. under the tradename "Kraton G-1651"), 3 parts by weight of maleic anhydride as the crosslinking agent and 1 part by weight of 2,3-dimethyl-2,3-diphenybutane (produced by Nippon Oil & Fat Co., Ltd. under the tradename "NOPHMER BC") as the radical generating agent were dry-blended and melt kneaded by the use of a 30 mm twin-screw extruder at revolution of 200 rpm at a temperature set to 300° C. The resultant strand was cooled and then pelletized to produce SEBS/SPS graft copolymer. The resultant copolymer was subjected to Soxhlet extraction using hexane as the solvent to remove the residual SEBS and was dried. The graft copolymerization of SEBS and SPS was confirmed by the weight of the hexane-insoluble portion and $^1$H-NMR analysis.

PREPARATION EXAMPLES 2 TO 19

The procedure in Preparation Example 1 was repeated except that the kinds of modified SPS and rubbery elastomers, SPS/rubbery elastomer ratio, and the kinds and amounts of crosslinking agents and radical generating agents were altered as given in Table 1.

TABLE 1

| | (b) | | (c) | | Others(crosslinking agent, radical generating agent) | |
|---|---|---|---|---|---|---|
| | Kind | Part/s by weight | kind | Part/s by weight | kind | Part/s by weight |
| Preparation Example 1 | Reference Example 1 | 10 | G-1651[1] | 90 | maleic anhydride NOPHMER BC[6] | 1 0.1 |
| Preparation Example 2 | Reference Example 1 | 50 | G-1651 | 50 | maleic anhydride NOPHMER BC | 3 0.1 |
| Preparation Example 3 | Reference Example 2 | 10 | NS-312S[2] | 90 | NOPHMER BC | 0.1 |
| Preparation Example 4 | Reference Example 2 | 50 | NS-312S | 50 | NOPHMER BC | 0.1 |
| Preparation Example 5 | Reference Example 2 | 10 | G-1651 | 90 | maleic anhydride NOPHMER BC | 3 0.1 |
| Preparation Example 6 | Reference Example 2 | 50 | G-1651 | 50 | maleic anhydride NOPHMER BC | 3 0.1 |
| Preparation Example 7 | Reference Example 3 | 10 | M-1913[3] | 90 | none | — |
| Preparation Example 8 | Reference Example 3 | 50 | M-1913 | 50 | none | — |
| Preparation Example 9 | Reference Example 3 | 10 | T-7711SP[4] | 90 | none | — |
| Preparation Example 10 | Reference Example 3 | 50 | T-7711SP | 50 | none | — |
| Preparation Example 11 | Reference Example 4 | 10 | M-1913 | 90 | none | — |

TABLE 1-continued

| | (b) | | (c) | | Others(crosslinking agent, radical generating agent) | |
|---|---|---|---|---|---|---|
| | Kind | Part/s by weight | kind | Part/s by weight | kind | Part/s by weight |
| Preparation Example 12 | Reference Example 4 | 50 | M-1913 | 50 | none | — |
| Preparation Example 13 | Reference Example 5 | 10 | Z-513[5] | 90 | none | — |
| Preparation Example 14 | Reference Example 5 | 50 | Z-513 | 50 | none | — |
| Preparation Example 15 | Reference Example 5 | 80 | Z-513 | 20 | none | — |
| Preparation Example 16 | Reference Example 5 | 90 | Z-513 | 10 | none | — |
| Preparation Example 17 | Reference Example 5 | 95 | Z-513 | 5 | none | — |
| Preparation Example 18 | Reference Example 5 | 50 | M-1913 | 50 | hexamethylenediamine | 0.1 |
| Preparation Example 19 | Reference Example 5 | 50 | M-1913 | 50 | EPICHLON-50[7] | 0.5 |

Remarks
[1] SEBS produced by Shell Chem. Co.
[2] SBR produced by Nippon Zeon Co., Ltd.
[3] maleic anhydride-modified SEBS produced by Asahi Chemical Industry Co., Ltd.
[4] maleic anhydride-modified EPR produced by Japan Synthetic Rubber Co., Ltd.
[5] epoxy group-modified SEBS produced by Asahi Chemical Industry Co., Ltd.
[6] 2,3-dimethyl-2,3-diphenylbutane produced by Nippon Oil & Fat Co., Ltd.
[7] epoxy resin, type bisphenol A produced by Dainippon Ink & Chemicals, Inc.
[8] oligo amide produced by Kyoeisha Chemical Co., Ltd.

EXAMPLE 1

To 97.2 parts by weight of syndiotactic polystyrene (SPS, weight-average molecular weight of 305,000, weight-average molecular weight Mw/number-average molecular weight Mn of 2.35) were added, as the component (b)+(c), 27.8 parts by weight of the product in Preparation Example 1, 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 2.

EXAMPLES 2-10

The procedure in Example 1 was repeated except that the amount of the component (a) and the kind and amount of the component (b)+(c) were altered as given in Table 2. The result are given in Table 2.

EXAMPLE 11

To 95 parts by weight of syndiotactic polystyrene (SPS, weight-average molecular weight of 305,000, weight-average molecular weight Mw/number-average molecular weight Mn of 2.35) were added, 5 parts by weight of the product in Reference Example 5 as the component (b), 25 parts by weight of epoxy group-modified SEBS (Z-513, produced by Asahi Chemical Industry Co., Ltd.) as the component (c), 1 part by weight of p-(tert-butyl)aluminum bezoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3',5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 2.

EXAMPLE 12

The procedure in Example 11 was repeated except that the component (b) was used in an amount of 100 parts by weight and the component (a) was not used. The results are given in Table 2.

EXAMPLE 13

The procedure in Example 11 was repeated except that there were used 25 parts by weight of maleic anhydride-modified SEBS (M-1913, produced by Asahi Chemical Industry Co., Ltd.) as the component (c) and 0.5 part by weight of epoxy resin, type bisphenol A (EPICHLON-50, produced by Dainippon Ink & Chemicals, Inc.) as the crosslinking agent for the components (b) and (c). The results are given in Table 2.

COMPARATIVE EXAMPLES 1-7

The procedure in Example 1 was repeated except that there were used the respective products as the component (c) as shown in Table 2 for the kind and the amount based on 100 parts by weight of the SPS without the use of the component (b). The results are given in Table 2.

As is clear from Table 2, the use of the high molecular compound comprising modified SPS and the rubbery elastomer in the objective SPS composition makes it possible to remarkably improve its impact strength and elongation without detriment to its modulus of elasticity and heat distortion temperature as compared with the rubbery elastomer alone without SPS. In addition, as is demonstrated in Examples 11 to 13, it is possible to produce the objective resin composition by simultaneously kneading each of the components for preparing the components (a) and (b)+(c), respectively.

by weight of the high molecular compound in Preparation Example 2 as the compatibilizer component (b)+(c),23 parts by weight of SEBS (Kraton G-1651, produced by Shell Chem. Co.), 1 part by weight of p-(tert-butyl) aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3',5'-di-

TABLE 2-1

|  | (a) | [(b) + (c)] | |
|---|---|---|---|
|  | Amount added (part/s by weight) | kind | Amount added (part/s by weight) |
| Example 1 | 97.2 | Preparation Example 1 | 27.8 |
| Example 2 | 98.8 | Preparation Example 1 | 12.2 |
| Example 3 | 97.2 | Preparation Example 3 | 27.8 |
| Example 4 | 97.2 | Preparation Example 5 | 27.8 |
| Example 5 | 97.2 | Preparation Example 7 | 27.8 |
| Example 6 | 97.2 | Preparation Example 9 | 27.8 |
| Example 7 | 97.2 | Preparation Example 11 | 27.8 |
| Example 8 | 97.2 | Preparation Example 13 | 27.8 |
| Example 9 | 75.0 | Preparation Example 14 | 50.0 |
| Example 10 | — | Preparation Example 15 | 100.0 |
| Example 11 | 95.0 | Reference Example 5 | 5.0 |
|  |  | Z-513 | 25.0 |
| Example 12 |  | Reference Example 5 | 100.0 |
|  |  | Z-513 | 25.0 |
| Example 13 | 95.0 | Reference Example 5 | 5.0 |
|  |  | M-1913 | 25.0 |
|  |  | EPICHLON-50 | 0.5 |
|  |  | (c) |  |
| Comparative Example 1 | 100 | G-1651 | 25.0 |
| Comparative Example 2 | 100 | G-1651 | 11.0 |
| Comparative Example 3 | 100 | NS-312S | 25.0 |
| Comparative Example 4 | 100 | M-1913 | 25.0 |
| Comparative Example 5 | 100 | EP-912P | 25.0 |
| Comparative Example 6 | 100 | T-7711SP | 25.0 |
| Comparative Example 7 | 100 | Z-513 | 25.0 |

TABLE 2-2

|  | Izod impact strength with notch[1] (kj/m$^2$) | Elongation[2] (%) | Flexural modulus of elasticity[3] (MPa) | Heat distortion temperature[4] (°C.) |
|---|---|---|---|---|
| Example 1 | 11.5 | 19.1 | 2540 | 130 |
| Example 2 | 7.0 | 10.0 | 3700 | 146 |
| Example 3 | 14.2 | 21.0 | 2490 | 131 |
| Example 4 | 13.1 | 18.7 | 2500 | 132 |
| Example 5 | 15.5 | 20.1 | 2510 | 132 |
| Example 6 | 8.7 | 9.8 | 2100 | 117 |
| Example 7 | 15.8 | 19.3 | 2510 | 135 |
| Example 8 | 15.5 | 20.5 | 2550 | 133 |
| Example 9 | 16.1 | 22.4 | 2530 | 133 |
| Example 10 | 17.1 | 25.1 | 2560 | 135 |
| Example 11 | 14.1 | 18.5 | 2570 | 131 |
| Example 12 | 16.0 | 21.0 | 2510 | 135 |
| Example 13 | 14.8 | 18.1 | 2550 | 134 |
| Comparative Example 1 | 5.2 | 11.1 | 2470 | 125 |
| Comparative Example 2 | 2.8 | 2.0 | 3580 | 140 |
| Comparative Example 3 | 8.5 | 15.0 | 2500 | 130 |
| Comparative Example 4 | 6.0 | 11.0 | 2520 | 131 |
| Comparative Example 5 | 3.9 | 6.9 | 2100 | 118 |
| Comparative Example 6 | 4.0 | 5.8 | 2150 | 120 |
| Comparative Example 7 | 5.8 | 13.8 | 2540 | 126 |

Remarks
[1] according to JIS K-7110
[2] according to JIS K-7113
[3] according to JIS K-7203
[4] according to JIS K-7207

EXAMPLE 14

To 98 parts by weight of syndiotactic polystyrene (SPS, weight-average molecular weight of 305,000, weight-average molecular weight Mw/number-average molecular weight Mn of 2.35) were added, 4 parts tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tesile test, flexural test and Izod impact test, respectively. Measurements were made of Izod impact Izod impact strangth, elongation, modulus of elasticity and heat distortion temperature of the test pieces thus obtained. The results are given in Table 3.

EXAMPLES 15-25

The procedure in Example 14 was repeated except that the amount of the component (a) and the kinds and amounts of the component (b)+(c) and the component (d) were altered as given in Table 3. The result are given in Table 3.

EXAMPLE 26

To 97 parts by weight of syndiotactic polystyrene (SPS, weight-average molecular weight of 305,000, weight-average molecular weight Mw/number-average molecular weight Mn of 2.35) were added, 3 parts by weight of the product in Reference Example 5 as the component (b), 3 parts by weight of epoxy group-modified SEBS (Z-513, produced by Asahi Chemical Industry Co., Ltd.) as the component (c), 22 parts by weight of SEBS (Kraton G-1651, produced by Shell Chem. Co.) as the component (d), 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3'5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a swin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 3.

EXAMPLES 27-29

The procedure in Example 26 was repeated except that there were used maleic anhydride-modified SEBS (M-1913, produced by Asahi Chemical Industry Co., Ltd.) as the component (c) in respective amounts given in Table 3 and 0.1 part by weight of epoxy resin, type bisphenol A (EPICHLON-50, produced by Dainippon Ink & Chemicals, Inc.) as the crosslinking agent for the components (b) and (c). The results are given in Table 3.

As is clear from Table 3, the use of the high molecular compound comprising modified SPS and the rubbery elastomer as the compatibilizer in the objective SPS composition makes it possible to remarkably improve its impact strength and elongation without detriment to its modulus of elasticity and heat distortion temperature as compared with the rubbery elastomer alone without SPS as shown in Table 2 on the columns of Comparative Examples 1-7. In addition, as is demonstrated in Examples 26-29, it is possible to produce the objective resin composition by simultaneously kneading each of the components for preparing the components (a) and (b)+(c), respectively.

TABLE 3-1

| | (a) Amount Added (part/s by weight) | [(b) + (c)] Kind | Amount added (part/s by weight) | (d) kind | Amount added (part/s by weight) |
|---|---|---|---|---|---|
| Example 14 | 98 | Preparation Example 2 | 4 | G-1651 | 23 |
| Example 15 | 98 | Preparation Example 4 | 4 | NS-312S | 23 |
| Example 16 | 98 | Preparation Example 6 | 4 | G-1651 | 23 |
| Example 17 | 98 | Preparation Example 8 | 4 | G-1651 | 23 |
| Example 18 | 98 | Preparation Example 10 | 4 | EP-912P | 23 |
| Example 19 | 98 | Preparation Example 12 | 4 | G-1651 | 23 |
| Example 20 | 98 | Preparation Example 14 | 4 | G-1651 | 23 |
| Example 21 | 98 | Preparation Example 14 | 4 | G-1651 | 9 |
| Example 22 | 84 | Preparation Example 15 | 20 | G-1651 | 21 |
| Example 23 | — | Preparation Example 16 | 111 | G-1651 | 14 |
| Example 24 | 90 | Preparation Example 18 | 20 | G-1651 | 15 |
| Example 25 | 80 | Preparation Example 19 | 40 | G-1651 | .5 |
| Example 26 | 97 | Reference Example 5 M-513 | 3 3 | G-1651 | 22 |
| Example 27 | 90 | Reference Example 5 M-1913 EPICHLON-50 | 10 5 0.1 | G-1651 | 20 |
| Example 28 | — | Reference Example 5 M-1913 EPICHLON-50 | 100 5 0.1 | G-1651 | 20 |

-continued

| | | | | | |
|---|---|---|---|---|---|
| Example 29 | 90 | Reference Example 5 | 10 | G-1651 | 20 |
| | | M-1913 | 5 | | |
| | | LIGHT AMIDE WH215[8)] | 3 | | |

TABLE 3-2

| | Izod impact strength with notch[1)] (kj/m$^2$) | Elongation[2)] (%) | Flexural modulus of elasticity[3)] (MPa) | Heat distortion temperature[4)] (°C.) |
|---|---|---|---|---|
| Example 14 | 12.3 | 19.3 | 2550 | 130 |
| Example 15 | 14.0 | 20.1 | 2590 | 130 |
| Example 16 | 13.1 | 18.1 | 2510 | 132 |
| Example 17 | 14.1 | 18.5 | 2500 | 135 |
| Example 18 | 8.5 | 10.0 | 2010 | 110 |
| Example 19 | 13.2 | 18.1 | 2490 | 132 |
| Example 20 | 14.3 | 20.5 | 2520 | 133 |
| Example 21 | 7.1 | 10.6 | 3680 | 144 |
| Example 22 | 14.8 | 21.4 | 2500 | 131 |
| Example 23 | 15.6 | 23.0 | 2600 | 135 |
| Example 24 | 13.9 | 20.0 | 2490 | 133 |
| Example 25 | 13.5 | 18.1 | 2550 | 130 |
| Example 26 | 12.1 | 17.0 | 2550 | 131 |
| Example 27 | 12.5 | 17.6 | 2560 | 131 |
| Example 28 | 15.5 | 23.5 | 2570 | 137 |
| Example 29 | 13.0 | 18.3 | 2490 | 128 |

[1)]according to JIS K-7110
[2)]according to JIS K-7113
[3)]according to JIS K-7203
[4)]according to JIS K-7207

EXAMPLE 30

To 98.8 parts by weight of syndiotactic polystyrene (SPS, weight-average molecular weight of 305,000, weight-average molecular weight Mw/number-average molecular weight Mn of 2.35) were added, 12.2 parts by weight of the product in Preparation Example 1 as the component (b)+(c), 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3'5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLES 31-39

The procedure in Example 30 was repeated except that the amount of the component (a) and the kinds and amounts of the component (b)+(c) were altered as given in Table 2. The result are given in Table 4.

EXAMPLE 40

To 95 parts by weight of syndiotactic polystyrene (SPS, weight-average molecular weight of 305,000, weight-average molecular weight Mw/number-average molecular weight Mn of 2.35) were added, 5 parts by weight of the product in Reference Example 5 as the component (b), 11 parts by weight of epoxy group-modified SEBS (Z-513, produced by Asahi Chemical Industry Co., Ltd.) as the component (c) 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3'5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was incorporated with 43 parts by weight of glass fiber by side feeding, melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 4.

EXAMPLE 41

The procedure in Example 40 was repeated except that the component (b) was used in an amount of 100 parts by weight and the component (a) was not used. The results are given in Table 4.

EXAMPLE 42

The procedure in Example 40 was repeated except that there were used 11 parts by weight of maleic anhydride-modified SEBS (M-1913, produced by Asahi Chemical Industry Co., Ltd.) as the component (c) and 0.5 part by weight of epoxy resin, type bisphenol A (EPICHLON-50, produced by Dainippon Ink & Chemicals, Inc.) as the crosslinking agent for the components (b) and (c). The results are given in Table 4.

Comparative Examples 8–14

The procedure in Example 30 was repeated except that there were used the respective products as the component (c) as shown in Table 4 for the kind and the amount based on 100 parts by weight of the SPS without the use of the component (b). The results are given in Table 4.

As is clear from Table 4, the use of the high molecular compound comprising modified SPS and the rubbery elastomer in the objective SPS composition makes it possible to remarkably improve its impact strength and elongation without detriment to its modulus of elasticity and heat distortion temperature as compared with the rubbery elastomer alone without SPS. In addition, as is demonstrated in Examples 40 to 42, it is possible to produce the objective resin composition by simultaneously kneading each of the components for preparing the components (a) and (b)+(c), respectively.

TABLE 4-1

|  | (a) Amount added (part/s by weight) | [(b) +(c)] kind | Amount added (part/s by weight) |
|---|---|---|---|
| Example 30 | 98.8 | Preparation Example 1 | 12.2 |
| Example 31 | 99.4 | Preparation Example 1 | 5.6 |
| Example 32 | 98.8 | Preparation Example 3 | 12.2 |
| Example 33 | 98.8 | Preparation Example 5 | 12.2 |
| Example 34 | 98.8 | Preparation Example 7 | 12.2 |
| Example 35 | 98.8 | Preparation Example 9 | 12.2 |
| Example 36 | 98.8 | Preparation Example 11 | 12.2 |
| Example 37 | 98.8 | Preparation Example 13 | 12.2 |
| Example 38 | 89.0 | Preparation Example 14 | 22.0 |
| Example 39 | — | Preparation Example 16 | 111.0 |
| Example 40 | 95.0 | Reference Example 5 | 5.0 |
|  |  | Z-513 | 11.0 |
| Example 41 | — | Reference Example 5 | 100.0 |
|  |  | Z-513 | 11.0 |
| Example 42 | 95.0 | Reference Example 5 | 5.0 |
|  |  | M-1913 | 11.0 |
|  |  | EPICHLON-50 | 0.5 |
|  |  | (c) |  |
| Comparative Example 8 | 100 | G-1651 | 5.0 |
| Comparative Example 9 | 100 | G-1651 | 11.0 |
| Comparative Example 10 | 100 | NS-312S | 11.0 |
| Comparative Example 11 | 100 | M-1913 | 11.0 |
| Comparative Example 12 | 100 | EP-912P | 11.0 |
| Comparative Example 13 | 100 | T-7711SP | 11.0 |
| Comparative Example 14 | 100 | Z-513 | 11.0 |

TABLE 4-2

| | Izod impact strength with notch[1] (kj/m$^2$) | Elongation[2] (%) | Flexural modulus of elasticity[3] (MPa) | Heat distortion temperature[4] (°C.) |
|---|---|---|---|---|
| Example 30 | 11.8 | 2.9 | 8680 | 243 |
| Example 31 | 8.9 | 2.0 | 9700 | 239 |
| Example 32 | 14.7 | 2.8 | 8780 | 230 |
| Example 33 | 14.9 | 2.9 | 8720 | 244 |
| Example 34 | 13.1 | 2.9 | 8650 | 230 |
| Example 35 | 10.1 | 2.0 | 8050 | 215 |
| Example 36 | 13.1 | 2.9 | 8660 | 225 |
| Example 37 | 14.2 | 2.7 | 8750 | 226 |
| Example 38 | 15.5 | 2.8 | 8710 | 226 |
| Example 39 | 16.3 | 3.0 | 8660 | 230 |
| Example 40 | 13.3 | 2.7 | 8700 | 231 |
| Example 41 | 15.0 | 2.9 | 8710 | 229 |
| Example 42 | 13.0 | 2.7 | 8750 | 229 |
| Comparative Example 8 | 3.8 | 1.0 | 9750 | 230 |
| Comparative Example 9 | 4.1 | 1.0 | 8600 | 221 |
| Comparative Example 10 | 3.1 | 1.0 | 8710 | 222 |
| Comparative Example 11 | 4.2 | 1.2 | 8720 | 225 |
| Comparative Example 12 | 3.1 | 1.0 | 8430 | 210 |
| Comparative Example 13 | 3.9 | 1.1 | 8480 | 210 |
| Comparative Example 14 | 4.8 | 1.3 | 8700 | 223 |

Remarks
[1] according to JIS K-7110
[2] according to JIS K-7113
[3] according to JIS K-7203
[4] according to JIS K-7207

EXAMPLE 43

To 98 parts by weight of syndiotactic polystyrene (SPS, weight-average molecular weight of 305,000, weight-average molecular weight Mw/number-average molecular weight Mn of 2.35) were added, 4 parts by weight of the high molecular compound obtained in Preparation Example 2 as the compatibilizer [(b)+(c)], 9 parts by weight of SEBS (Kraton G-1651, produced by Shell Chem. Co.), 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3'5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 5.

EXAMPLES 44–53

The procedure in Example 43 was repeated except that the amount of the component (a) and the kinds and amounts of the component (b)+(c) and the component (d) were altered as given in Table 5. The result are given in Table 5.

EXAMPLE 54

To 97 parts by weight of syndiotactic polystyrene (SPS, weight-average molecular weight of 305,000, weight-average molecular weight Mw/number-average molecular weight Mn of 2.35) were added, 3 parts by weight of the product in Reference Example 5 as the component (b), 3 parts by weight of epoxy group-modified SEBS (Z-513, produced by Asahi Chemical Industry Co., Ltd.) as the component (c), 8 parts by weight of SEBS (Kraton G-1651, produced by Shell Chem. Co.) as the component (d), 1 part by weight of p-(tert-butyl)aluminum benzoate (produced by Dainippon Ink & Chemicals, Inc. under the tradename "PTBBA-Al") as the nucleating agent; 0.1 part by weight of (2,6-di-tert-butyl-4-methylphenyl)pentaerythritol diphosphite (produced by Adeka Argus Co., Ltd. under the tradename "PEP-36") as an antioxidant and 0.1 part by weight of tetrakis [methylene-3-(3'5'-di-tert-butyl-4'-hydroxyphenyl)] propionate (produced by Adeka Argus Co., Ltd. under the tradename "MARK A060") also as an antioxidant, and the resultant mixture was blended with a Henschel mixer. Subsequently the blend was melt kneaded and pelletized with a twin-screw extruder. The pellet thus obtained was injection molded to produce test pieces for tensile test, flexural test and Izod impact test, respectively. Measurements were made of Izod impact strength, elongation, modulus of elasticity and heat distortion temperature of the test pieces thus obtained. The results are given in Table 5.

EXAMPLES 55–57

The procedure in Example 54 was repeated except that there were used maleic anhydride-modified SEBS (M-1913, produced by Asahi Chemical Industry Co., Ltd.) as the component (c) in respective amounts given in Table 5 and 0.1 part by weight of epoxy resin, type hisphenol A (EPICHLON-50, produced by Dainippon Ink & Chemicals, Inc.) as the crosslinking agent for the components (b) and (c). The results are given in Table 5.

As is clear from Table 5, the use of the high molecular compound comprising modified SPS and the rubbery elastomer as the compatibilizer in the objective SPS composition makes it possible to remarkably improve its impact strength and elongation without detriment to its modulus of elasticity and heat distortion temperature as compared with the rubbery elastomer alone without SPS as shown in Table 4 on the columns of Comparative Examples 8–14. In addition, as is demonstrated in Examples 54–57, it is possible to produce the objective resin composition by simultaneously kneading each of the components for preparing the components (a) and (b)+(c), respectively.

TABLE 5-1

| | (a) Amount added (part/s by weight) | [(b) + (c)] Preparation Example | Amount added (part/s by weight) | (d) kind | Amount added (part/s by weight) |
|---|---|---|---|---|---|
| Example 43 | 98 | Preparation Example 2 | 4 | G-1651 | 9 |
| Example 44 | 98 | Preparation Example 4 | 4 | NS-312S | 3 |
| Example 45 | 98 | Preparation Example 6 | 4 | G-1651 | 9 |
| Example 46 | 98 | Preparation Example 8 | 4 | G-1651 | 9 |
| Example 47 | 98 | Preparation Example 10 | 4 | EP-912P | 9 |
| Example 48 | 98 | Preparation Example 12 | 4 | G-1651 | 9 |
| Example 49 | 98 | Preparation Example 14 | 4 | G-1651 | 9 |
| Example 50 | 84 | Preparation Example 15 | 20 | G-1651 | 7 |
| Example 51 | — | Preparation Example 17 | 105.3 | G-1651 | 5.7 |
| Example 52 | 98 | Preparation Example 18 | 4 | G-1651 | 9 |
| Example 53 | 98 | Preparation Example 19 | 4 | G-1651 | 9 |
| Example 54 | 97 | Reference Example 5<br>M-513 | 3<br>3 | G-1651 | 8 |
| Example 55 | 90 | Reference Example 5<br>M-1913<br>EPICHLON-50 | 10<br>5<br>0.1 | G-1651 | 6 |
| Example 56 | — | Reference Example 5<br>M-1913<br>EPICHLON-50 | 100<br>5<br>0.1 | G-1651 | 6 |
| Example 57 | 90 | Reference Example 5<br>M-1913<br>LIGHT AMIDE WH 215[8] | 10<br>5<br>3 | G-1651 | 6 |

TABLE 5-2

| | Izod impact strength with notch[1] (kj/m$^2$) | Elongation[2] (%) | Flexural modulus of elasticity[3] (MPa) | Heat distortion temperature[4] (°C.) |
|---|---|---|---|---|
| Example 43 | 11.0 | 2.7 | 8680 | 241 |
| Example 44 | 14.0 | 2.9 | 8650 | 230 |
| Example 45 | 13.1 | 2.7 | 8690 | 240 |
| Example 46 | 13.5 | 2.9 | 8700 | 228 |
| Example 47 | 9.7 | 2.0 | 8010 | 213 |
| Example 48 | 13.0 | 2.8 | 8710 | 231 |
| Example 49 | 13.8 | 2.9 | 8750 | 232 |
| Example 50 | 15.0 | 2.9 | 8700 | 229 |
| Example 51 | 14.9 | 2.8 | 8720 | 228 |
| Example 52 | 14.8 | 2.9 | 8710 | 230 |
| Example 53 | 13.0 | 2.7 | 8650 | 230 |
| Example 54 | 13.0 | 2.7 | 8690 | 229 |
| Example 55 | 13.2 | 2.8 | 8650 | 231 |
| Example 56 | 14.8 | 2.9 | 8700 | 231 |

| | -continued | | | |
|---|---|---|---|---|
| Example 57 | 13.4 | 2.9 | 8590 | 228 |

[1] according to JIS K-7110
[2] according to JIS K-7113
[3] according to JIS K-7203
[4] according to JIS K-7207

EXAMPLE 58

The Izod impact test pieces which had been prepared in Example 1 were crushed into small pieces, which were again made into test pieces to measure the dynamical properties thereof. The results are given in Table 6.

EXAMPLES 59–65 AND COMPARATIVE EXAMPLES 15–19

The procedure in Example 58 was repeated except that there were used the Izod impact test pieces as shown in Table 6 on the columns of Examples 3, 6, 8, 14, 15, 18 and 20 and those of Comparative Examples 1, 3, 5, 6, and 7, respectively. The results are given Table 6.

As is clear from Table 6, the resin composition of the present invention comprising the high molecular compound consisting essentially of the modified SPS as the component (b) and the rubbery elastomer as the component (c) is not considerably deteriorated in physical properties owing to recycling, thus making itself practically useful.

TABLE 6

| | | Change in Izod impact strength with the number of recycles (KJ/m$^2$)[1] | | | | |
|---|---|---|---|---|---|---|
| Test piece | used | once | twice | thrice | four times | five times |
| Example 58 | Example 1 | 11.5 | 10.5 | 9.8 | 9.2 | 8.9 |
| Example 59 | Example 3 | 14.2 | 13.0 | 11.9 | 11.3 | 10.8 |
| Example 60 | Example 6 | 8.7 | 7.0 | 6.2 | 5.8 | 5.6 |
| Example 61 | Example 8 | 15.5 | 14.2 | 13.2 | 12.5 | 12.0 |
| Example 62 | Example 14 | 12.3 | 11.0 | 9.9 | 9.0 | 8.7 |
| Example 63 | Example 15 | 14.0 | 12.8 | 12.0 | 10.9 | 10.0 |
| Example 64 | Example 18 | 8.5 | 7.2 | 6.1 | 5.8 | 5.5 |
| Example 65 | Example 20 | 14.3 | 13.0 | 12.3 | 12.0 | 11.5 |
| Comparative Example 15 | Comparative Example 1 | 5.2 | 3.2 | 2.4 | 2.1 | 1.8 |
| Comparative Example 16 | Comparative Example 3 | 8.5 | 6.1 | 4.0 | 3.2 | 2.8 |
| Comparative Example 17 | Comparative Example 5 | 3.9 | 2.8 | 2.1 | 1.8 | 1.6 |
| Comparative Example 18 | Comparative Example 6 | 4.0 | 2.8 | 2.3 | 1.9 | 1.5 |
| Comparative Example 19 | Comparative Example 7 | 5.8 | 3.8 | 3.0 | 2.5 | 2.3 |

[1] according to JIS K-7110

What is claimed is:

1. A polystyrene composition, comprising: syndiotactic polystyrene and a syndiotactic polystyrene impact modifier; said syndiotactic polystyrene impact modifier being the reaction product of a syndiotactic polystyrene having a first reactive functional group, and a rubbery elastomer containing a second reactive functional group, said first and second reactive functional groups being reactive with each other.

2. The polystyrene composition of claim 1 wherein said syndiotactic polystyrene is present in an amount greater than 60 weight percent based on the total weight of the polystyrene composition.

3. The polystyrene composition of claim 1 wherein said syndiotactic polystyrene consists essentially of syndiotactic polystyrene derived from polymerizing a styrenic monomer selected from the group consisting of styrene, α-methylstyrene, p-methylstyrene, and mixtures thereof.

4. The polystyrene composition of claim 1 wherein said syndiotactic polystyrene containing said first reactive functional group is prepared by copolymerizing styrene with a comonomer selected from the group consisting of p-methylstyrene, divinylbenzene, maleic anhydride, and glycidylmethacrylate.

5. The styrene composition of claim 1 wherein said rubbery elastomer having said second reactive functional group is selected from the group consisting of hydrogenated styrene/butadiene/styrene copolymer rubber, styrene/butadiene/styrene copolymer rubber, styrene/butadiene copolymer rubber, ethylene/propylene copolymer rubber, and modified rubbers therefrom.

6. The styrene composition of claim 1, further comprising: from 1 to 100 parts by weight, based on 100 parts by weight of the composition of claim 1, of a rubbery elastomer not reactive with said syndiotactic polystyrene having said first reactive functionality.

7. The polystyrene composition of claim 1 further comprising from 1 to 350 parts of an inorganic filler, said parts by weight based on 100 parts by weight of the composition of claim 1.

8. The polystyrene composition of claim 7 wherein said inorganic filler comprises glass fibers.

9. A polystyrene composition, comprising: syndiotactic polystyrene and a syndiotactic polystyrene impact modifier: said syndiotactic polystyrene impact modifier being the reaction product of a syndiotactic polystyrene having a first reactive functional group, and a rubbery elastomer having a second reactive functional group, said first and second reactive groups not reactive with each other, the reaction between said syndiotactic polystyrene having said first reactive functional group and said rubbery elastomer having said second reactive functional group facilitated by a crosslinking agent reactive with both said first and said second reactive functional groups.

10. The polystyrene composition of claim 9 wherein said syndiotactic polystyrene is present in an amount greater than 60 weight percent based on the total weight of the polystyrene composition.

11. The polystyrene composition of claim 9 wherein said syndiotactic polystyrene consists essentially of syndiotactic polystyrene derived from polymerizing a styrenic monomer selected from the group consisting of styrene, α-methylstyrene, p-methylstyrene, and mixtures thereof.

12. The polystyrene composition of claim 9 wherein said syndiotactic polystyrene containing said first reactive functional group is prepared by copolymerizing styrene with a comonomer selected from the group consisting of p-methylstyrene, divinylbenzene, maleic anhydride, and glycidylmethacrylate.

13. The styrene composition of claim 9 wherein said rubbery elastomer having said second reactive functional group consisting of hydrogenated styrene/butadiene/styrene copolymer rubber, styrene/butadiene/styrene copolymer rubber, styrene/butadiene copolymer rubber, ethylene/propylene copolymer rubber, and modified rubbers therefrom.

14. The styrene composition of claim 9, further comprising: from 1 to 100 parts by weight, based on 100 parts by weight of the composition of claim 9, of a rubbery elastomer which is not reacted with said syndiotactic polystyrene having said first reactive functionality.

15. The polystyrene composition of claim 9 further comprising from 1 to 350 parts of an inorganic filler, said parts by weight based on 100 parts by weight of the composition of claim 9.

16. The polystyrene composition of claim 15 wherein said inorganic filler comprises glass fibers.

* * * * *